United States Patent
Jiang et al.

(10) Patent No.: US 11,892,877 B2
(45) Date of Patent: Feb. 6, 2024

(54) INFORMATION HANDLING SYSTEM PARTIAL SPECTRUM CAMERA SHUTTER

(71) Applicant: Dell Products L.P., Round Rock, TX (US)

(72) Inventors: Shu Yu Jiang, New Taipei (TW); Howard Yh Huang, New Taipei (TW)

(73) Assignee: Dell Products L.P., Round Rock, TX (US)

( * ) Notice: Subject to any disclaimer, the term of this patent is extended or adjusted under 35 U.S.C. 154(b) by 556 days.

(21) Appl. No.: 16/880,603

(22) Filed: May 21, 2020

(65) Prior Publication Data

US 2021/0365671 A1 Nov. 25, 2021

(51) Int. Cl.
| | | |
|---|---|---|
| *G06F 1/16* | (2006.01) | |
| *G06V 40/16* | (2022.01) | |
| *G06V 10/143* | (2022.01) | |
| *H04N 23/51* | (2023.01) | |
| *H04N 23/55* | (2023.01) | |

(52) U.S. Cl.
CPC .......... *G06F 1/1637* (2013.01); *G06F 1/1686* (2013.01); *G06V 10/143* (2022.01); *G06V 40/166* (2022.01); *H04N 23/51* (2023.01); *H04N 23/55* (2023.01)

(58) Field of Classification Search
CPC .................................................. G06V 40/166
USPC ............................................................ 382/118
See application file for complete search history.

(56) References Cited

U.S. PATENT DOCUMENTS

| | | | |
|---|---|---|---|
| 9,369,170 B2 | 6/2016 | Sorrentino | |
| 9,467,605 B2 | 10/2016 | Johnson et al. | |
| 2013/0162798 A1* | 6/2013 | Hanna | A61B 3/14 |
| | | | 348/78 |
| 2017/0140221 A1 | 5/2017 | Ollila et al. | |
| 2017/0364736 A1* | 12/2017 | Ollila | H04N 5/3532 |
| 2018/0121724 A1* | 5/2018 | Ovsiannikov | G06V 40/19 |
| 2018/0341835 A1* | 11/2018 | Siminoff | G06V 10/751 |
| 2019/0082519 A1* | 3/2019 | Gagne-Keats | G01J 3/36 |

* cited by examiner

*Primary Examiner* — Joel W Fosselman
(74) *Attorney, Agent, or Firm* — ZAGORIN CAVE LLP; Robert W. Holland

(57) ABSTRACT

An information handling system camera is secured against unauthorized image captures by a shutter that mechanically closes across the camera lens to block visible light from entering the camera. The shutter integrates an infrared bypass filter that passes through infrared light while blocking visible light so that the camera can support facial recognition when the mechanical shutter secures the camera to prevent unauthorized capture of visual images.

20 Claims, 4 Drawing Sheets

INFORMATION HANDLING SYSTEM PARTIAL SPECTRUM CAMERA SHUTTER

BACKGROUND OF THE INVENTION

Field of the Invention

The present invention relates in general to the field of portable information handling system security, and more particularly to an information handling system partial spectrum camera shutter.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems typically present information as visual images at a display. Portable information handling systems, such as tablets and convertible systems, generally integrate a display in a portable housing. Desktop or other stationary systems typically rely upon a peripheral display interfaced through a cable. Portable information handling systems also typically can interface with peripheral displays to supplement the presentation of visual images provided by an integrated display.

Generally, information security represents an important concern of individuals and enterprises who use information handling systems. To help maintain information security, information handling systems typically execute anti-malware applications that identify and attempt to prevent unauthorized access to information. Typically, enterprise information technology professionals include anti-malware and security applications on enterprise information handling system to help monitor information security. Although these applications are effective at monitoring operations at an information handling system, physical security of information handling systems presents a different challenge. For example, if an enterprise end user information handling system is lost or stolen, malicious actors can directly access information without executing malicious code.

One way to physically secure information is to use password protection and encryption. For instance, a BIOS password used to encrypt information stored in persistent storage can prevent execution of an operating system and access to the stored information. One difficulty with password protection is that end users will disable the protection or effectively do so by selecting easily broken passwords. Often end users are motivated to bypass password protections because inputting a password interferes with system usage. As an additional safeguard, some security systems also include biometric security measures, such as fingerprint or facial recognition techniques that verify an end user's identity.

Facial recognition is typically performed by capturing an image of an end user while the end user looks at a display, such as when signing onto an information handling system. Facial recognition typically relies upon a camera integrated in the display that also supports videoconferencing. To provide three dimensional depth sensing of facial features, facial recognition is typically enhanced with illumination by an infrared light source so that the infrared light can detect distances that identify facial features.

One difficulty with facial recognition is that end users will often cover their camera when not in use, such as with a videoconference. Covering the camera provides an end user an extra degree of security by presenting a malicious actor from gaining access to the camera and observing the end user. However, when the camera is covered facial recognition will not work.

SUMMARY OF THE INVENTION

Therefore, a need has arisen for a system and method which provides physical security for a camera integrated in an information handling system without interfering with facial recognition operations.

In accordance with the present invention, a system and method are provided which substantially reduce the disadvantages and problems associated with previous methods and systems for performing facial recognition with a camera integrated at a display. A shutter selectively covers and uncovers an information handling system camera lens to block and unblock capturing of visual images by the camera. The shutter integrates a pass filter for a predetermined light spectrum, such as an infrared spectrum, to pass light through to the camera lens when blocked by the shutter so that the camera can capture an image in the predetermined spectrum that supports facial recognition.

More specifically, an information handling system interfaces with a camera to support videoconferencing and similar functions, such as with a camera integrated in a display bezel. During operations that call for capture of visual images of the camera, an end user moves the shutter to unblock the camera lens. To improve system security against a malicious hack of the system that offers access to a malicious actor of images captured by the camera, the end user moves the shutter to block visible light from entering the camera. With the shutter in the blocking position, facial recognition is performed by capturing infrared light that passes through the shutter, which integrates an infrared pass filter. For instance, the shutter is manufactured from a material that blocks visible light and passes through infrared light associated with an infrared illumination source. In one embodiment, the end user is provided with an indication of a facial recognition operation by a light emitting diode (LED) that illuminates near the camera.

The present invention provides a number of important technical advantages. One example of an important technical advantage is that an information handling system camera can close a shutter to prevent unauthorized remote viewing by physical security without disabling facial recognition. For example, a shutter has a material that filters visible light while passing infrared light used to perform facial recognition. The filter shutter provides physical security against camera hacking without preventing operation of the camera for facial recognition. The end user is assured of camera security by dark material of the shutter that blocks visible light so that the camera is not visible. An LED provides the end user with an indication of a facial recognition operation, such as by illumination when an infrared illumination source provides infrared light to support facial recognition.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

An information handling system camera is secured from capturing unauthorized visual images by a shutter that covers the camera lens, the shutter having an infrared bypass filter that passes through infrared light to support facial recognition when the shutter is closed. For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 1:
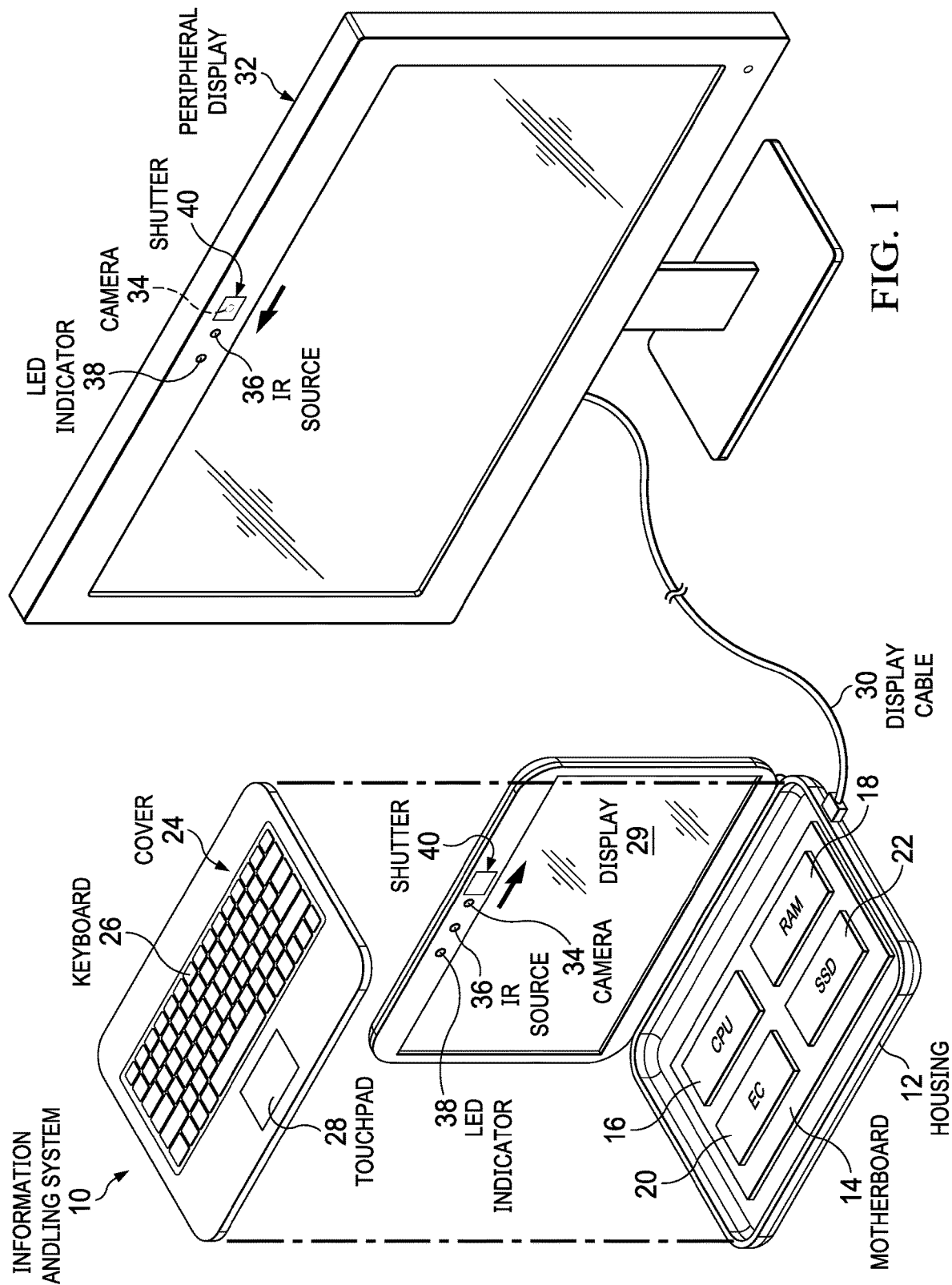
FIG. 1 depicts an information handling system interfaced with cameras having a shutter with a bypass filter that supports facial recognition.

Referring now to FIG. 1, an information handling system 10 is depicted interfaced with cameras having a shutter 40 with a bypass filter that supports facial recognition. In the example embodiment, information handling system 10 processes information with processing components disposed in a housing 12, such as a portable housing that converts between open and closed positions. In the example embodiment, a base portion of housing 12 holds a motherboard 14 that interfaces the processing components. A central processing unit (CPU) 16 executes instructions to process information in cooperation with random access memory (RAM) 18 that stores the instructions and information. An embedded controller (EC) 20 manages system operating constraints, such as power application, thermal conditions and interactions with input/output (I/O) devices like integrated and peripheral keyboards. A solid state drive (SSD) 22 provides persistent storage for applications and instructions during power down states. For example, SSD 22 stores an operating system and applications that are retrieved to RAM 18 for execution by CPU 16. In alternative embodiments, alternative types of processing components may be included to enhance system operation, such as a graphics processing unit (GPU) that processes information to define pixel values for presentation at a display 29 integrated in housing 12 or a peripheral display 32 interfaced through a display cable 30. The processing components are captured in housing 12 under a cover 24 that integrates a keyboard 26 and touchpad 28 for accepting end user inputs.

In the example embodiment, integrated display 29 and peripheral display 32 present visual images from information provided from the processing components, such as pixel values. Each of integrated display 29 and peripheral display 32 integrate a camera 34 that captures visual images in the visible light spectrum and in the infrared light spectrum. For instance, each camera 34 supports a video conferencing application that executes on CPU 16 to communicate visual images through a network interface. In addition, each camera 34 supports a facial recognition application that executes on CPU 16 to capture an infrared image of an end user face and validate the end user's identity. To perform the facial recognition, an infrared source 36 provides infrared illumination, such as an LED that illuminates in an infrared spectrum matching the infrared light spectrum captured by camera 34 for performing facial recognition. A shutter 40 integrates in each display proximate camera 34 to selectively block and unblock a lens of each shutter 40 to mechanically prevent unauthorized capture of visual images by each camera 34 should a malicious actor obtain control of the information handling system. Should a malicious actor attempt to capture images from each camera 34 with shutter 40 closed in a blocking position, only a black image will be captured. When an end user desires to use camera 34 for an authorized purpose, the end user slides the shutter out of the blocking position to expose the camera lens to ambient light.

To support facial recognition operations with shutter 40 in a closed position that blocks the lens of camera 34, shutter 40 is manufactured in full or in part from a material that blocks passage of visible light but passes through infrared light as an infrared bypass filter. During a facial recognition operation, infrared source 36 illuminates the region in front of the display where an end user's face is expected to be located. The infrared light reflects off the end user's face back to camera 34 where it passes through the infrared bypass filter for capture by the camera. During illumination of the end user, a visible light LED indicator 38 illuminates to provide a visible indication to the end user of the facial recognition operation. The infrared bypass filter is, for example, a glass treated to block visible light and pass through infrared light tuned to the infrared spectrum illuminated by infrared source 36. Alternatively, a treated plastic material may be used or a liquid crystal material that has a current applied during illumination of infrared source 36 so that the crystals block all light when no current is applied and pass infrared light when a current is applied.

Figure 2:
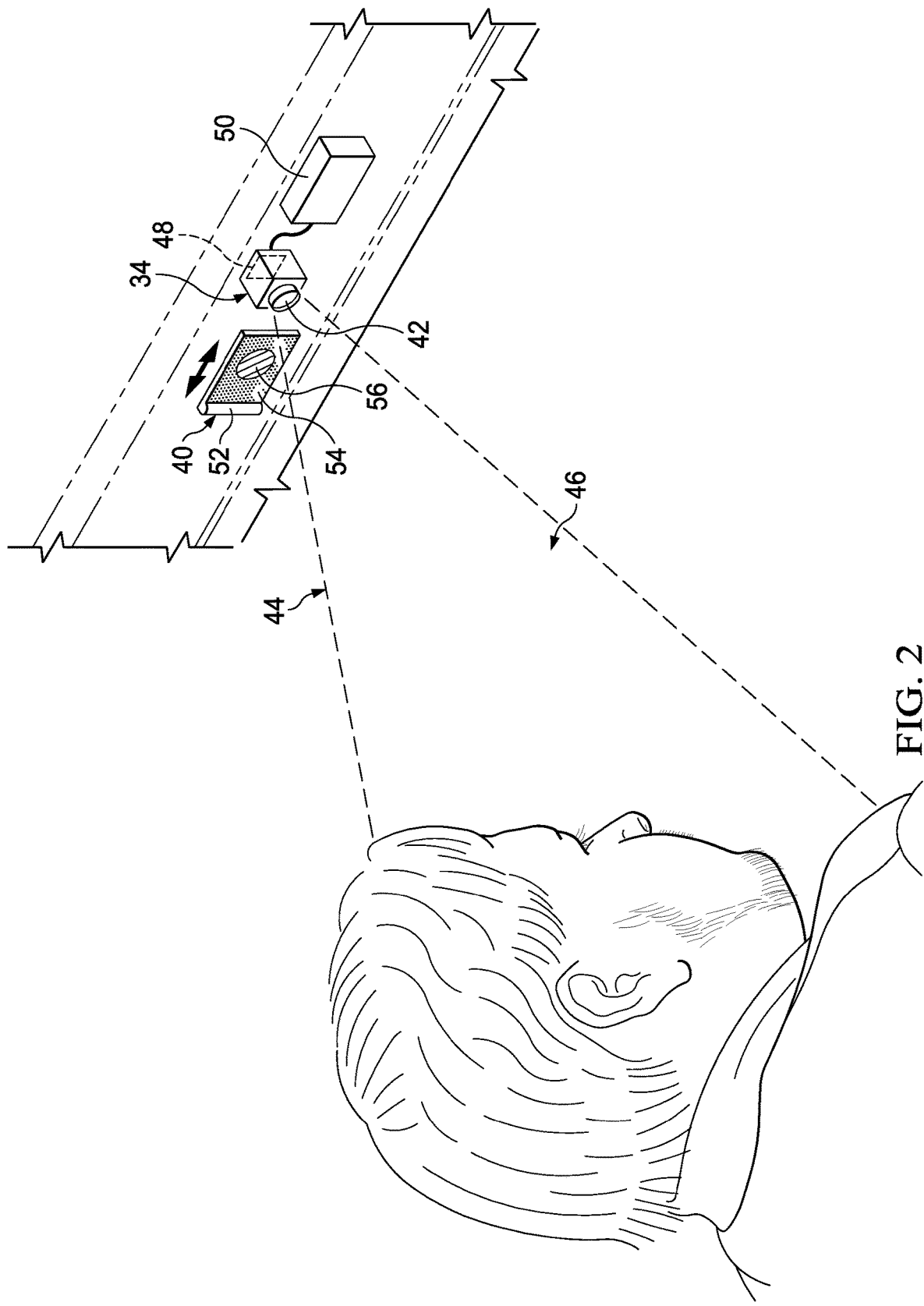
FIG. 2 depicts a perspective view of a system that manages facial recognition operations while securing a camera from capture of visual images by a malicious actor.

Referring now to FIG. 2, a perspective view depicts a system that manages facial recognition operations while securing a camera 34 from capture of visual images by a malicious actor. In the example embodiment, camera 34 with a lens field of view 44 captures visual images through a lens 42 that focuses the image against a light sensor 48. During normal operations, such as during a video conference, lens field of view 44 is typically wide enough to capture a wide area in front of a display. During a facial recognition operation, camera 34 may focus on a facial recognition field of view 46 located more directly in front of the display, such as an area that is scan to determine distances from a time of flight of infrared light to the facial features of interest. The infrared light captured by light sensor 48 is provided to an image signal processor 50, which analyzes the captured image to determine facial characteristics for comparison against facial characteristics of authorized users, such as by a facial recognition application executing on the CPU. Shutter 40 has a handle 52 that an end user can grasp to slide shutter 40 between an open position that exposes lens 42 and a closed position that blocks lens 42. In the example embodiment, an opaque material that blocks all light is disposed around an infrared pass filter material 56 that allows infrared illumination to pass through along the facial recognition field of view 46. The narrower facial recognition field of view 46 relative to the full field of view 44 limits facial recognition operations to an area that is relevant to the end user's expected facial features location. In such an example embodiment, a malicious attacker has less opportunity to gather information about the information handling system location should the attacker obtain access to the facial recognition application.

Figure 3:
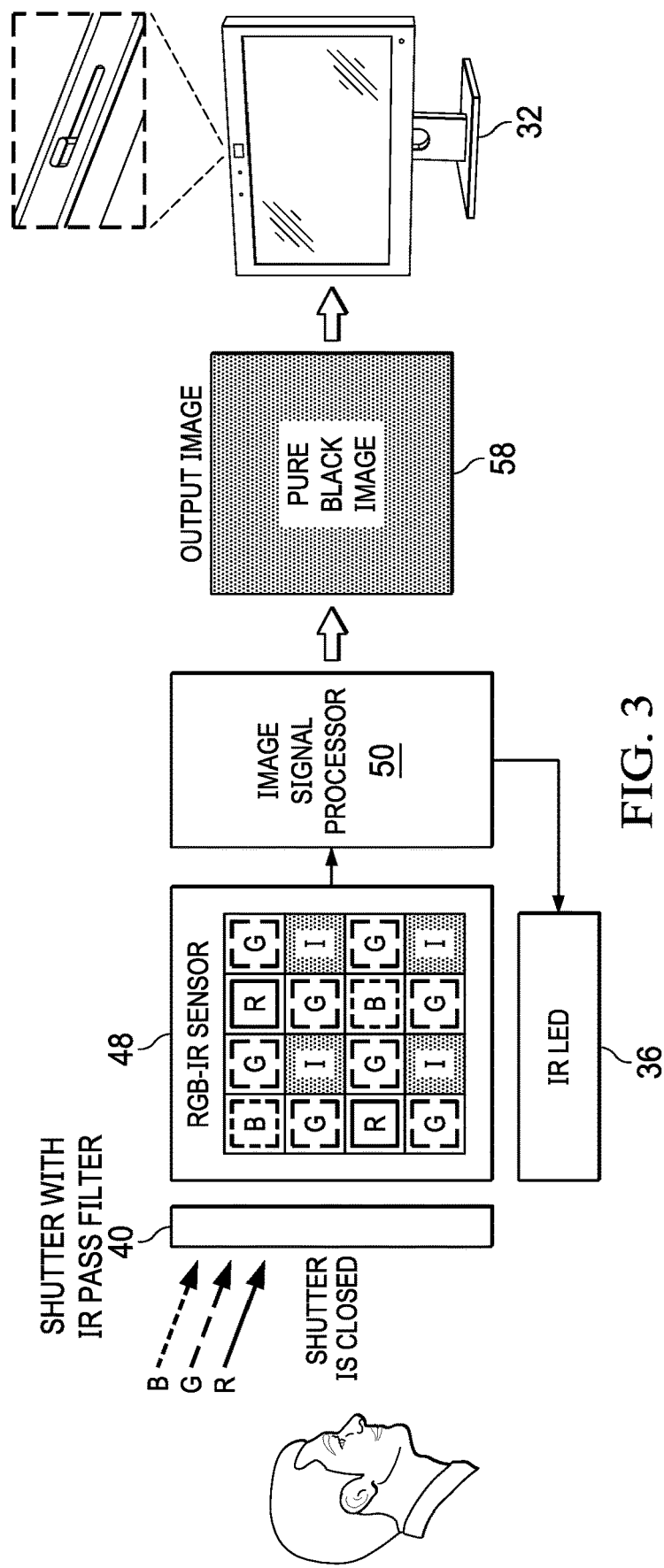
FIG. 3 depicts a block diagram of an example embodiment having visual light blocked by the infrared bypass filter to prevent capture of a visual image by an unauthorized end user.

Referring now to FIG. 3, a block diagram depicts an example embodiment having visual light blocked by the infrared bypass filter to prevent capture of a visual image by an unauthorized end user. In the example embodiment, shutter 40 with the infrared bypass filter is slid in front of the camera to block visible light spectrum energy from passing through to light sensor 48, as depicted by the red, green and blue arrows directed at shutter 40. With shutter 40 in a closed position, an end user sees a dark shape instead of the camera lens so that the end user feels comfortable visible light is blocked from entering the camera. Image signal processor 50 detects no visual light so that only a pure black image 58 is captured. Display 32 presents a video chat application with a dark output reflecting the lack of visual light captured by camera 34.

Figure 4:
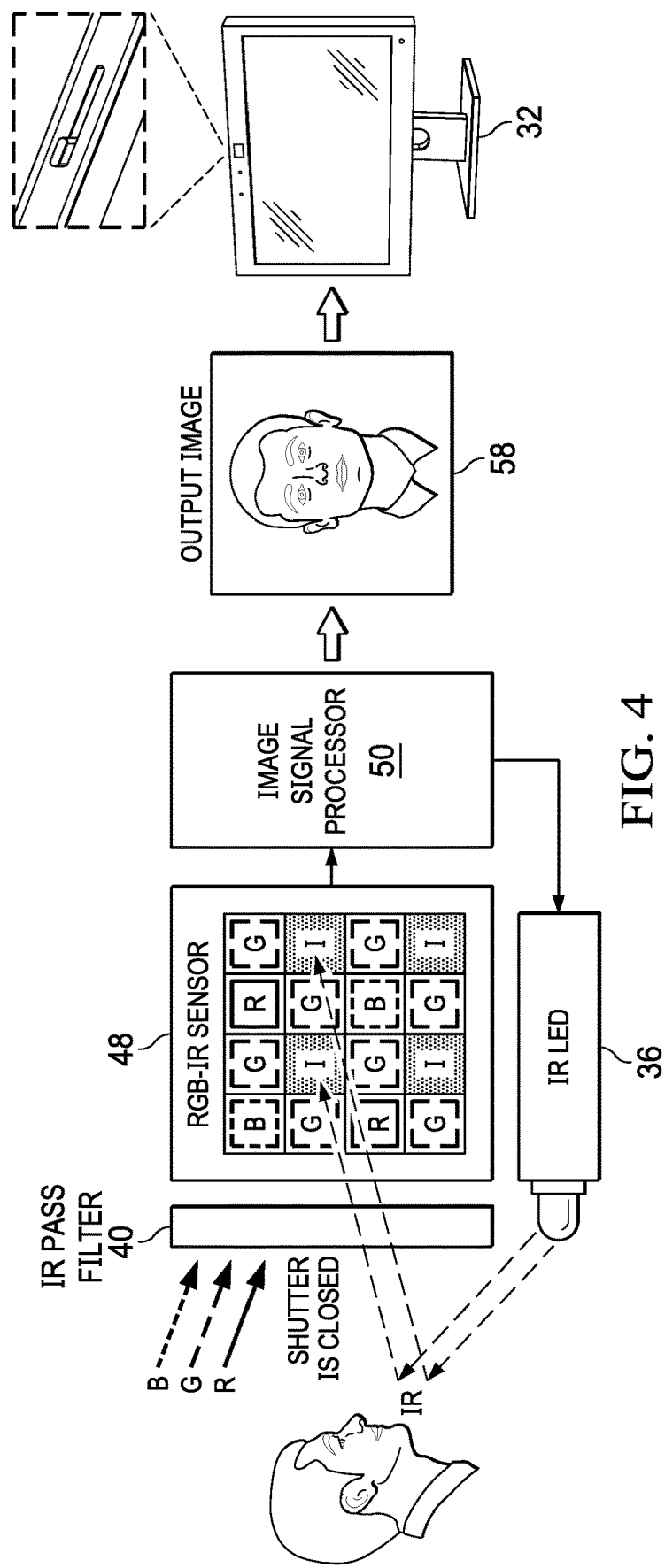
FIG. 4 depicts a block diagram of an example embodiment having infrared light passed through the bypass filter to allow capture of an infrared image by an authorized facial recognition application.

Referring now to FIG. 4, a block diagram depicts an example embodiment having infrared light passed through the bypass filter to allow capture of an infrared image by an authorized facial recognition application. With shutter 40 closed, visible light is blocked from entering the camera for detection by light sensor 48 and processing by image signal processor 50. Infrared illumination generated by infrared source 36 is directed at the facial features of an end user and reflects back through the infrared bypass filter of shutter 40 for capture by light sensor 48. Image signal processor 50 analyzes the captured infrared light to output an image 58 based upon the infrared light for comparison with authorized end user images so that the end user's access to the information handling system is verified.

Although the present invention has been described in detail, it should be understood that various changes, substitutions and alterations can be made hereto without departing from the spirit and scope of the invention as defined by the appended claims.

What is claimed is:

1. An information handling system comprising:
a housing;
a processor disposed in the housing and operable to execute instructions to process information;
a memory interfaced with the processor and operable to store the instructions and information;
a display interfaced with the processor and operable to present the information as visual images;
a camera disposed in the display and operable to capture an image analyzed to perform facial recognition in a predetermined spectrum; and
a shutter operable to slide to selectively block and expose the camera, the shutter having a filter that passes only light in the predetermined spectrum associated with the facial recognition and filters all visible light when the shutter slides to block the camera, the camera capturing visual images with the visible light when the shutter exposes the camera.

2. The information handling system of claim 1 further comprising:
an illumination source operable to provide light associated with the facial recognition;
wherein the filter passes the light provided by the illumination source.

3. The information handling system of claim 2 wherein the illumination source comprises infrared light and the filter filters all visible light.

4. The information handling system of claim 3 wherein the filter comprises a liquid crystal activated to pass infrared light when the illumination source illuminates infrared light.

5. The information handling system of claim 3 further comprising a light emitting diode that provides a visible light indication when the illumination source provides illumination.

6. The information handling system of claim 3 wherein the filter passes the illumination through an opening narrowed to a field of view associated with facial recognition.

7. The information handling system of claim 3 wherein the filter slides between an open position that exposes the camera and a closed position that covers the camera.

8. The system of claim 3 wherein the display and camera integrate in the housing.

9. The system of claim 3 wherein the display comprises a peripheral display separate from the housing and the camera integrates in the peripheral display.

10. A method for securing an information handling system, the method comprising:
capturing visual images with a camera of the information handling system in a visual light spectrum;
sliding a shutter across the camera, the shutter integrating a filter to block all visual spectrum light for the capturing visual images with the camera, the filter passing only a predetermined light spectrum outside of the visual light spectrum to secure the camera from capture of visual images in the visual light spectrum;
capturing light with the camera in the predetermined light spectrum through the filter; and
applying the captured light of the predetermined light spectrum to perform facial recognition.

11. The method of claim 10 further comprising:
interfacing the information handling system with a peripheral display; and
integrating the camera in the peripheral display.

12. The method of claim 10 further comprising:
integrating a display in a portable housing of the information handling system; and integrating the camera in the portable housing of the information handling system.

13. The method of claim 10 wherein the filter comprises an infrared pass filter that passes infrared light and blocks visible light.

14. The method of claim 13 further comprising:
illuminating an infrared light source to perform facial recognition; and
capturing the infrared illumination with the camera through the infrared pass filter, the infrared pass filter passing only infrared illumination of the infrared light source.

15. The method of claim 10 further comprising illuminating a visible light emitting diode in response to illuminating the infrared light source.

16. The method of claim 13 wherein the infrared pass filter narrows the field of view of the camera to a predetermined facial region.

17. An information handling system camera security system comprising:
a camera operable to capture images in a visible light spectrum and infrared images in an infrared light spectrum, the infrared images applied to perform facial recognition; and
a shutter sliding between a first position that blocks all light in the visible light spectrum from the camera and a second position that exposes the camera, the shutter integrating an infrared pass filter to allow the camera to receive infrared light with the shutter when the shutter blocks the camera, the camera capturing visual images in the visual spectrum when the shutter exposes the camera.

18. The information handling system camera security system of claim 17 wherein the camera has a field of view and the infrared pass filter passes infrared light to the camera though a more narrow field of view than the camera.

19. The information handling system camera security system of claim 17 further comprising:
an infrared light source operable to illuminate in the infrared light spectrum when a facial recognition is commanded; and
a visible light indicator operable to illuminate when the infrared light source illuminates to provide an indication of a facial recognition operation by the camera.

20. The information handling system camera security system of claim 19 wherein the infrared pass filter comprises liquid crystals that selectively activate to pass infrared light when performing a facial recognition operation.

* * * * *

UNITED STATES PATENT AND TRADEMARK OFFICE
CERTIFICATE OF CORRECTION

PATENT NO. : 11,892,877 B2
APPLICATION NO. : 16/880603
DATED : February 6, 2024
INVENTOR(S) : Shu Yu Jiang and Howard Yh Huang Page 1 of 1

It is certified that error appears in the above-identified patent and that said Letters Patent is hereby corrected as shown below:

In the Claims

In Column 8, Claim 18, Line 4, please replace "though" with --through--.

Signed and Sealed this
Fifth Day of March, 2024

Katherine Kelly Vidal
*Director of the United States Patent and Trademark Office*